United States Patent
Kulkarni et al.

(10) Patent No.: US 10,216,432 B1
(45) Date of Patent: Feb. 26, 2019

(54) MANAGING BACKUP UTILIZING RULES SPECIFYING THRESHOLD VALUES OF BACKUP CONFIGURATION PARAMETERS AND ALERTS WRITTEN TO A LOG

(71) Applicant: EMC IP Holding Company LLC, Hopkinton, MA (US)

(72) Inventors: Gururaj Kulkarni, Bangalore (IN); Shelesh Chopra, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 14/974,177

(22) Filed: Dec. 18, 2015

(51) Int. Cl.
*G06F 3/06* (2006.01)
*G06F 11/14* (2006.01)

(52) U.S. Cl.
CPC .......... *G06F 3/0619* (2013.01); *G06F 3/065* (2013.01); *G06F 3/067* (2013.01); *G06F 11/1458* (2013.01)

(58) Field of Classification Search
CPC ........ G06F 3/0619; G06F 3/065; G06F 3/067; G06F 11/1458
See application file for complete search history.

(56) References Cited

U.S. PATENT DOCUMENTS

| | | | |
|---|---|---|---|
| 7,054,892 B1* | 5/2006 | Phillips | G06F 11/1458 |
| 8,478,952 B1* | 7/2013 | Armorer | G06F 11/1461 |
| | | | 711/111 |
| 9,658,926 B1* | 5/2017 | Kulkarni | G06F 11/1458 |
| 9,842,027 B1* | 12/2017 | Chopra | G06F 11/1448 |
| 10,083,095 B1* | 9/2018 | Chopra | G06F 11/1464 |
| 2012/0215904 A1* | 8/2012 | Triantafillos | G06F 11/302 |
| | | | 709/224 |
| 2016/0232061 A1* | 8/2016 | Gaschler | G06F 11/1461 |

* cited by examiner

Primary Examiner — Glenn Gossage
(74) Attorney, Agent, or Firm — Staniford Tomita LLP

(57) ABSTRACT

Systems and techniques are provided for managing performance of a backup environment. A set of rules are stored, with each rule specifying a threshold value of a backup configuration parameter. Configurations of the backup environment are periodically obtained. Each obtained configuration includes a current value of the backup configuration parameter. A determination is made for each configuration as to whether the current value exceeds a suggested value, where the suggested value is based on the threshold value. If the current value exceeds the suggested value, an entry including an alert of a first type is written to a log. The log is analyzed, and if the frequency of entries in the log including alerts of the first type exceeds a threshold frequency, an entry including an alert of a second type, different from the first type, is written to the log. The threshold value of the backup configuration parameter may specify a maximum number of backup streams or a maximum number of backup clients, for example. Alert notifications may be displayed that inform a user of impacts to the performance of a backup.

17 Claims, 10 Drawing Sheets

| Stream Count Related Rule ID No | Description | DD Model | DD OS | Session Type | Max Value | Alert Type | Impact |
|---|---|---|---|---|---|---|---|
| Rule 1 | DD stream count | DD990 | 5.5 | Write | 540 | Warning (alert if 70% threshold reached) | DD has reached its threshold value of 70% from last X minutes which causes writes to become slow. |
| Rule 2 | DD stream count | DD990 | 5.5 | Write | 540 | Critical (alert if 100% threshold reached) | DD has reached its threshold value of 100% from last X minutes which causes sessions to terminate and impact overall performance. |

FIG. 7

| Sizing Related Rule ID No | Description | Appl. Ver | #Jobs | #CPU | #RAM | #Clients | Alert Type | Impact |
|---|---|---|---|---|---|---|---|---|
| Rule 1 | Number of clients supported | NW8.2 | 1000 | 2 | 8GB | 50-100 | Warning (alert if #clients increases above 50 on NW server) | You may start experiencing hanging and slowness due to memory and CPU crunch |
| Rule 2 | Number of clients supported | NW8.2 | 10000 | 4 | 16GB | 200-500 | Warning (alert if #clients increases above 200 on NW server) | You may start experiencing hanging and slowness due to memory and CPU crunch |
| Rule 3 | Number of clients supported | NW8.2 | 50000 | 8 | 32GB | 500-1500 | Warning (alert if #clients increases above 500 on NW server) | You may start experiencing hanging and slowness due to memory and CPU crunch |

FIG. 8

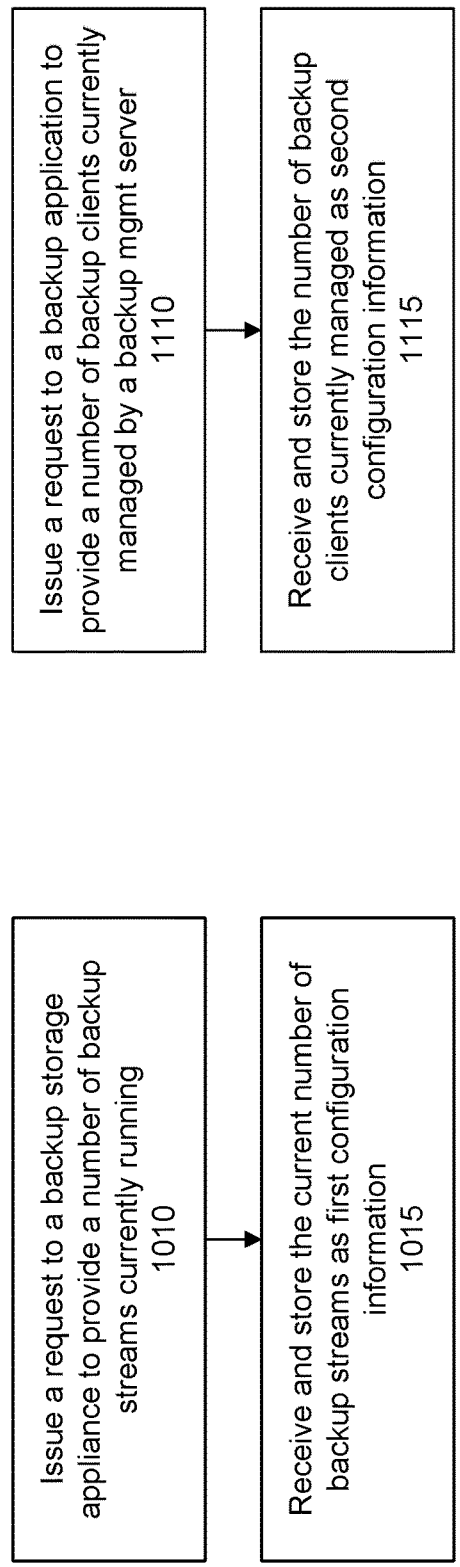

MANAGING BACKUP UTILIZING RULES SPECIFYING THRESHOLD VALUES OF BACKUP CONFIGURATION PARAMETERS AND ALERTS WRITTEN TO A LOG

TECHNICAL FIELD

Embodiments are generally directed to networked-based data backup methods, and more specifically to managing the performance of a backup environment.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Backing up files and other data helps to protect against accidental loss, data corruption, hardware failures, and natural disasters. A backup involves the participation of many different components. Typically, there is a client having the data to be backed up, a central server to coordinate the backup, and a storage device in which the backups are stored. There can be dozens, hundreds, or even thousands of clients to backup. A backup environment can be highly dynamic where the number of backup clients and data transfers vary greatly. The overall performance of a backup depends upon the capabilities of the various components. Generally, as the number of backup clients and data transfers increase, backup performance decreases. For example, the time to complete a backup may extend beyond the backup window or time allotted for a backup, or the backup system may become overloaded and backups may terminate or backups may stall.

Unfortunately, a backup administrator often has very little visibility into the performance of the backup environment until it is too late, i.e., a backup unexpectedly stalls or terminates because of a system overload. One reason is because information regarding the capabilities of the backup components, such as the capability of the storage appliance, is not shared with the central server. There is a need to provide increased and continuous visibility into the performance of a backup environment, including alerts and other notifications, in order to detect performance issues before such issues become serious problems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 7 shows an example of rules associated with backup stream counts according to a specific embodiment.

FIG. 8 shows an example of rules associated with backup client counts according to a specific embodiment.

FIG. 10 shows a flow of a process for obtaining a current number of backup streams according to a specific embodiment.

FIG. 11 shows a flow of a process for obtaining a current number of backup clients according to a specific embodiment.

DETAILED DESCRIPTION

Figure 1:
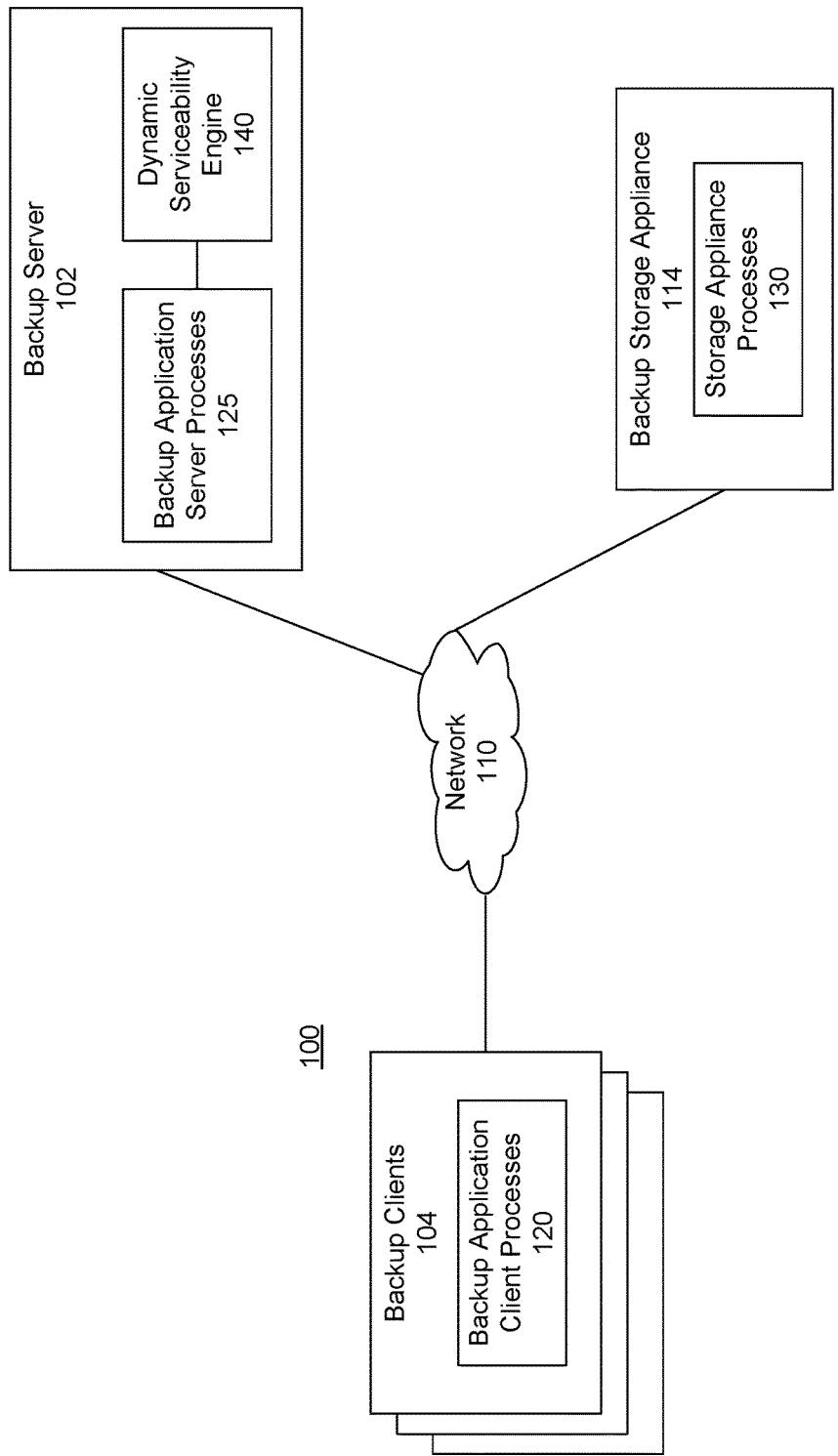
FIG. 1 is a diagram of a large-scale network implementing a data backup and recovery or restore process that includes a dynamic serviceability engine, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, compact disc read only memory (CDROM), digital versatile disc read only memory (DVDROM), tape, erasable programmable read-only memory (EPROM) or flash memory, or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for managing the performance of a backup platform and environment. The backup platform provides for the backing up and restoring of data and can be used as part of a disaster recovery or restoration solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for managing the performance of a backup in a computing environment. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup storage media of a backup storage appliance 114. The backup storage media may be located at any number of persistent storage locations and devices, such as local client storage, server storage, or network storage, which may at least be partially implemented through storage device arrays, such as redundant array of independent disks (RAID) components. In an embodiment, network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk arrays, may represent any practical storage device or set of devices, such as tape libraries, virtual tape libraries (VTL), fiber-channel (FC) storage area network devices, and OpenStorage (OST) devices. In a specific embodiment, however, the target storage devices represent disk-based targets implemented through virtual machine technology.

For the embodiment of FIG. 1, network system 100 includes any number of backup clients 104, backup server 102, and backup storage appliance 114. Backups and recoveries or restores are performed by a backup application that includes a client module or processes 120 executing at the backup clients, a server module or processes 125 executing at the backup server, and storage appliance processes 130 executing at the backup storage appliance.

A backup client executes processes 120 for backing up data to the backup storage appliance, restoring the backed up data, and coordinating with backup server processes 125 and processes 130 on the backup storage appliance. The backup server processes include processes to index the backups and identify which savesets reside on which backup devices or volumes of the backup storage appliance. The backup storage appliance executes processes 130 for receiving backup information from the backup client, writing data to the backup devices or volumes, sending tracking information to the backup server to track the data written to the devices or volumes, and reading the data from the devices or volumes at the request of the client, backup server, or both during a recovery or restore.

In a specific embodiment, the backup server includes a dynamic serviceability engine or service engine processes 140. The dynamic serviceability engine is responsible for managing the performance of the backup environment by monitoring the configuration of the backup environment, evaluating the configuration according to a particular set of rules, logging rule violations, and generating notifications for a backup administrator. The particular set of rules may be referred to as backup performance optimization rules. In a specific embodiment, the dynamic serviceability engine is decoupled from the backup application or platform. For example, the dynamic serviceability engine may execute as a code module that is separate from or independent of the backup application. The dynamic serviceability engine may be installed separately from or independent of the backup application. Decoupling the dynamic serviceability engine from the backup application allows the dynamic serviceability engine (including the performance rules of the dynamic serviceability engine) to be updated independent of the backup application. In another specific embodiment, the dynamic serviceability engine may be integrated with the backup application.

In an embodiment, system 100 may represent a Data Domain Restorer (DDR)-based deduplication storage system, and a backup storage appliance having the backup media may be implemented as a DDR Deduplication Storage server provided by EMC Corporation. However, other similar backup and storage systems are also possible. System 100 may utilize certain protocol-specific namespaces that are the external interface to applications and include Network File System (NFS) and Common Internet File System (CIFS) namespaces, as well as a virtual tape library (VTL) or Data Domain Boost (DD Boost) provided by EMC Corporation. In general, DD Boost is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes application programming interfaces (APIs) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
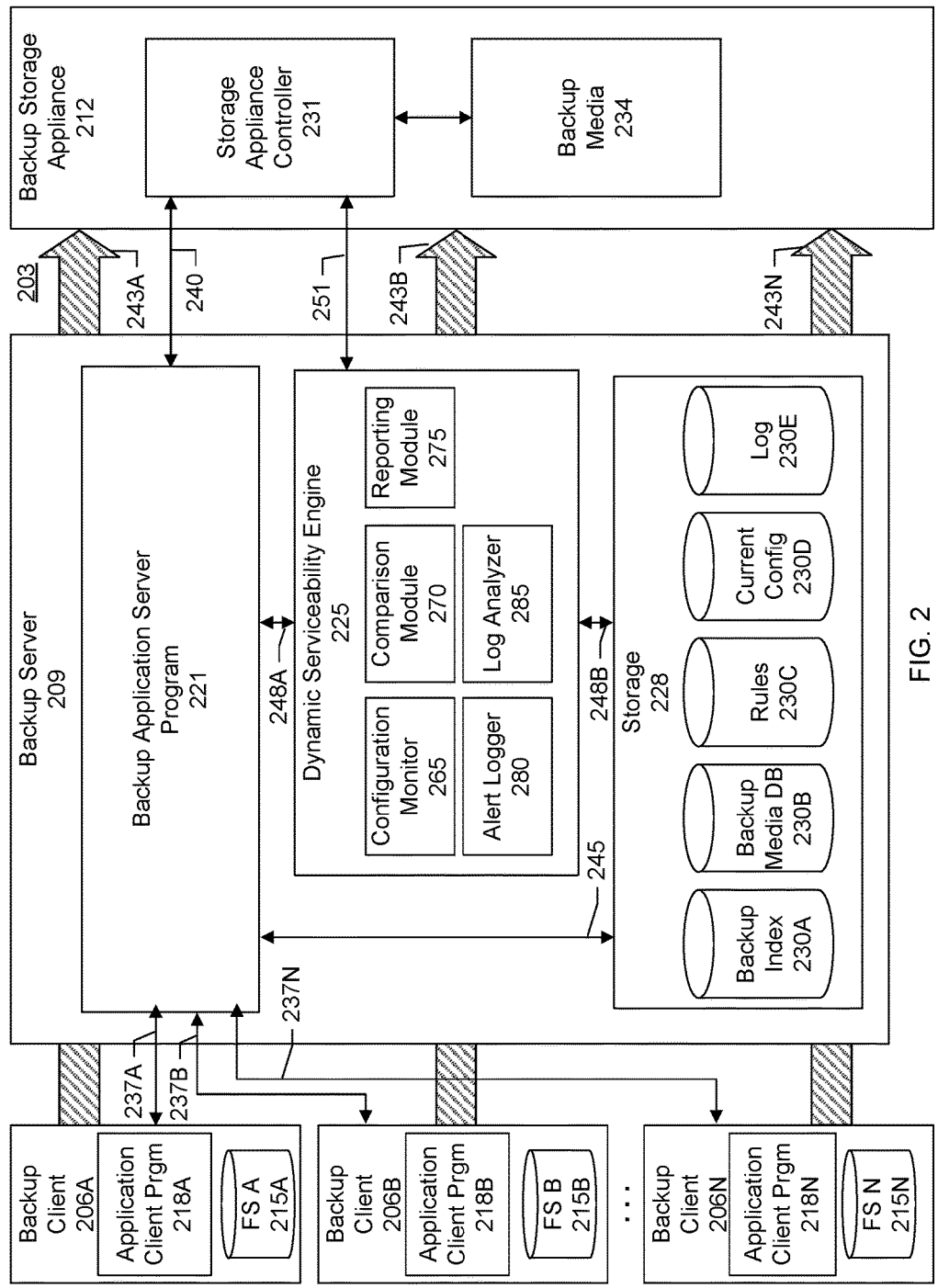
FIG. 2 shows a more detailed diagram of a system having a dynamic serviceability engine to manage backup performance according to a specific embodiment.

FIG. 2 shows further detail of a system or backup environment 203. This system or environment includes any number of backup clients 206A, 206B . . . 206N, a backup server 209, and a backup storage appliance 212. Backup clients 206A, 206B . . . 206N include data that may be stored in client file systems (FSs) 215A, 215B . . . 215N (FS A, FS B . . . FS N), respectively, and backup application client programs 218A, 218B . . . 218N, respectively. The backup server includes a backup application server program 221, a dynamic serviceability engine 225, and storage 228. The backup storage appliance 212 includes a storage appliance controller program 231 and backup media 234. The backup storage appliance provides a target for the backup and includes a set of disks to store backup data and a controller to service requests.

Storage 228 includes a backup index 230A, a backup media database (DB) 230B, a rules repository 230C, a current configuration database 230D, and a log 230E.

The backup application server program 221 coordinates with the backup application client and storage server programs to back up client data to the backup storage appliance, index or identify the data that was backed up, record information about the backup media and location of the backed up data, and recover or restore the data from the backup storage appliance to the clients.

In FIG. 2, arrows indicate communication and coordination among the various components and modules and the backup of data. More particularly, arrows 237A, 237B . . . 237N indicate communication between the backup application server and client programs when backing up (or restoring data). Arrow 240 indicates communication between the backup application server and backup storage appliance programs when backing up (or restoring data). Arrows 243A, 243B . . . 243N indicate the flow or path of data from the clients to the backup storage appliance during a backup. Arrow 245 indicates communication between the backup application server program 221 and storage 228. Arrows 248A, B indicate communication between the backup application server program 221 and the dynamic serviceability engine 225 and between the dynamic serviceability engine 225 and storage 228, respectively. Arrow 251 indicates communication between the dynamic serviceability engine 225 and the storage appliance controller program 231.

For example, at a scheduled or on-demand backup request, the backup application server program calls or instructs the backup application client program to prepare for a backup. A stream is established between the client and backup storage appliance. The stream may be referred to as a backup stream, savestream, or saveset stream. A saveset refers to a unit of data that is backed up. A saveset may include one or more files, file systems, or both on a single client. One stream is created for each saveset that is backed up. Specified files, objects, or data may be sent in a data stream from the client to the backup server to the backup storage appliance.

The backup application maintains information about a backup such as which files were backed up in index 230A. The index enables users, such as backup administrators, to browse a re-creation of the client's file system as it existed at a specified point in time, and to mark one or more files for recovery or restore. The backup application maintains entries for each backed up saveset and volume in backup media database 230B. The entries describe the storage location of data and the lifecycle status of all savesets and volumes managed by the backup server.

A backup environment can be very complex because it can include many different software components, hardware components, software versions, hardware versions, components from different vendors and manufacturers, and so forth. While a particular backup component may specify a particular threshold for a parameter of the backup component, it can be difficult to predict the actual performance of that particular backup component when placed in a production environment because of all the different variables. It is very difficult to test all the different permutations and combinations that may be found in various production or customer environments. A backup environment can also be very dynamic in that the number of backup clients, backup streams, or both can be ever changing. The number of backup clients, streams, or both can have a large impact on the performance of the backup environment. It is desirable to use computing resources efficiently. For example, having too many resources is wasteful. Having too few resources negatively affects performance. The backup administrator often has very little insight into the performance of the backup environment until it is too late, i.e., after the system has become overloaded and backups have stalled, terminated, or failed.

A system as shown in the example of FIG. 2, however, provides for periodically or continuously monitoring configuration variables that may affect the performance of a backup and generating meaningful alert notifications so that the backup administrator can take corrective action before the backup system becomes overloaded. Specifically, the dynamic serviceability engine 225 includes a configuration monitor 265, a comparison module 270, a reporting module 275, an alert logger 280, and a log analyzer 285.

Figure 3:
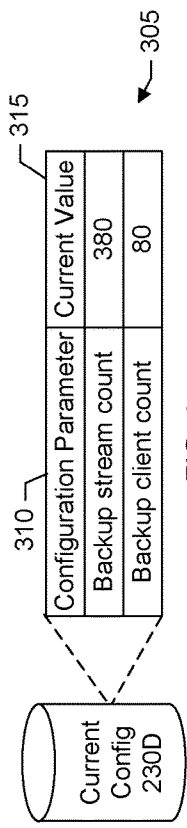
FIG. 3 shows an example of information that may be stored in a current configuration database according to a specific embodiment.

The configuration monitor is responsible for obtaining current configurations of the backup environment. The obtained configurations are stored in the current configuration database 230D. FIG. 3 shows an example of configuration information associated with the computing environment that may be obtained and stored in the current configuration database by the configuration monitor.

As shown in the example of FIG. 3, a table 305 includes first and second fields 310 and 315, respectively. The first field stores a particular backup configuration parameter. The second field stores a current value of the particular backup configuration parameter. In a specific embodiment, the configuration information includes a count of the number of backup streams running at the backup storage appliance and a count of the number of backup clients configured on the backup server. For example, according to the sample data shown in the table, the current configuration of the backup environment includes 380 backup streams that are currently running on the backup storage appliance and 80 backup clients configured on the backup server.

Referring back to FIG. 2, the comparison module 270 compares the current configuration against rules that are stored in rules repository 230C. The rules can be associated with specific components of the backup environment. For example, there can be a rule associated with a particular model and operating system version of a backup storage appliance. There can be a rule associated with a particular version of the backup application server program and backup server resources (e.g., number of central processors or amount of memory or RAM). The rules specify conditions for ensuring good performance of the backup environment.

Figure 4:
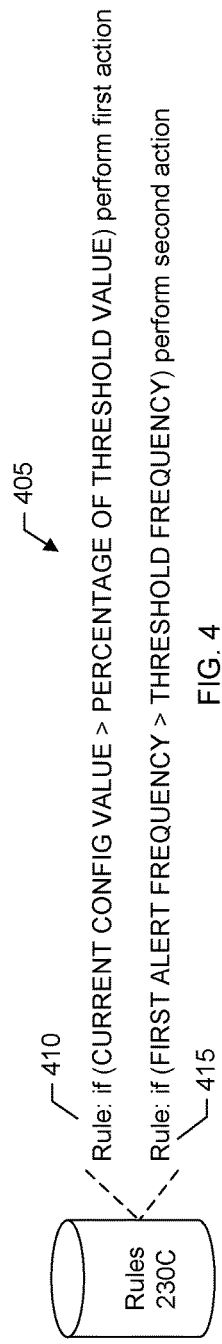
FIG. 4 shows an example of information that may be stored in a rules database according to a specific embodiment.

FIG. 4 shows an example of rules 405 that may be stored in the rules database. A rule may include a condition and one or more actions that the dynamic serviceability engine should perform when the condition is met or satisfied. Actions may include writing an entry into a log, generating and displaying an impact alert notification, or both.

In particular, a rule 410 specifies that a first action is to be performed when the current value of a backup configuration parameter (e.g., stream count or client count) exceeds a certain percentage of a threshold value corresponding to the backup configuration parameter. The percentage of the threshold value can be a suggested or recommended value for ensuring good performance of the backup environment.

For example, a particular backup storage appliance may specify a threshold number of backup streams that can be supported. While the backup storage appliance may theoretically be able to support that number of backup streams, in many cases that maximum value is based on ideal conditions. These ideal or optimum conditions may not necessarily exist in a production or customer environment. Using a percentage of the theoretical maximum can provide a more realistic assessment of performance.

Consider, as an example, that a backup storage appliance specifies a threshold stream count of 500, but tests or independent tests have indicated that exceeding 350 streams (or 70 percent of the threshold stream count) causes a severe degradation in the write speed of the backup storage appliance. Further consider that the current stream count is, according to the obtained configuration information (FIG. 3), 380. In this case, rule 410 is violated. The alert logger 280 (FIG. 2) is responsible for writing entries to log 230E when a rule is violated. In a specific embodiment, a rule violation triggers the writing a first type of alert (e.g., warning) in a log.

In another specific embodiment, the suggested value is the same as the threshold value. In cases where the threshold value includes a range of values, the suggested value may be a lower limit of the range, an upper limit of the range, or any value between the lower and upper limits (e.g., an average of the lower and upper limits). Identifying or determining the suggested value at which actions are triggered can be based on independent testing of the backup component. For example, different manufactures and vendors may have their own individual testing and certification procedures. Some manufactures may be less conservative than other manufactures when publishing the specifications of their products. As a result, it can be difficult for a backup administrator to gain visibility into the actual limits of the components and understand at what capacity there will be a severe drop in performance. The suggested value variable allows for establishing a realistic threshold for the performance of the backup component and the triggering of actions when that threshold is exceeded.

Figure 5:
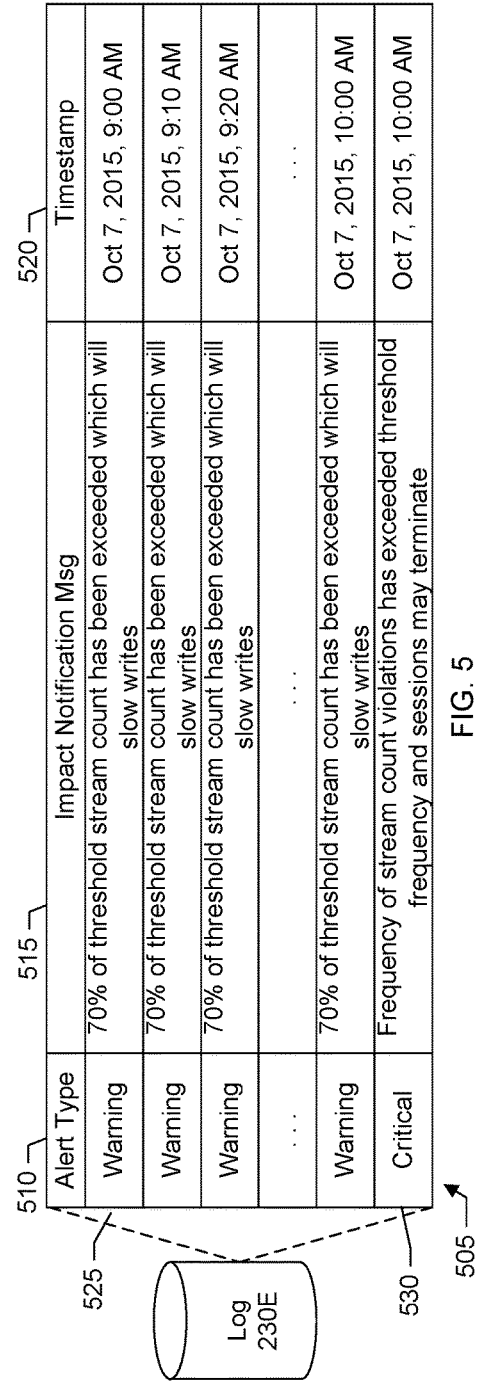
FIG. 5 shows an example of information that may be stored in a log according to a specific embodiment.

FIG. 5 shows an example of a log 505 having entries written by the alert logger. In the example shown in FIG. 5, the log includes first, second, and third columns 510, 515, and 520, respectively. The first column stores the type or priority of alert (e.g., warning or critical). The second column stores the impact notification message. The third column stores a timestamp indicating time and date that the entry was written. In particular, an entry 525 has been recorded on Oct. 7, 2015 at 9:00 AM. The entry includes a warning type alert and a message indicating that 70 percent of the threshold stream count has been exceeded which will slow writes. A log may record other parameters such as an identification of a particular backup process or daemon that is associated with the alert.

Referring back to FIG. 2, the log analyzer is responsible for analyzing the log to determine the frequency of alerts. In a specific embodiment, the rules database further includes rules for analyzing the log. For example, FIG. 4 shows an example of a rule 415 that may also be stored in the rules database. This rule defines a condition involving the frequency of alerts of a first type and a threshold frequency. The rule specifies that if warning type alerts (e.g., alerts of a first type) exceed a threshold frequency, a higher priority alert (e.g., critical) is logged.

For example, as shown in FIG. 5 an entry 530 has been recorded on Oct. 7, 2015 at 10:00 AM indicating that the frequency of stream count violations has exceeded the threshold frequency and that backup sessions may terminate. In a specific embodiment, the frequency is the rate at which violations of a first alert type (e.g., warnings) occur over a particular period of time or rolling period of time (e.g., 1 hour). If the threshold frequency is exceeded, a second alert type (e.g., critical) is recorded. Alerts of the second type have a higher priority than alerts of the first type. Thus, if a configuration issue remains unaddressed for a period of time (in which case warning alerts are continuously logged), the dynamic serviceability engine elevates the alert to a higher priority so that the configuration issue can be addressed before a more serious performance impact occurs.

Referring back to FIG. 2, the reporting module 275 acts as a user interface to the dynamic serviceability engine for displaying alert notifications from the log to the backup administrator. For example, the notifications may be displayed on an electronic screen so that the backup administrator can view the notification and take corrective action. The notifications may include an indication of the impact or potential impact of the rule violations. Different alert types may be associated with different colors, icons, sounds, or combinations of these. For example, warning notifications may be displayed on an electronic screen in text colored yellow. Critical notifications may be displayed in text colored red.

It should be appreciated that the components and modules shown in FIG. 2 can be functional entities where implementation of the functions can vary. For example, in some cases the backup application server program and dynamic serviceability engine are separate code modules. In other cases, the backup application server program and dynamic serviceability engine combined into one code module.

In a specific embodiment, the dynamic serviceability engine is provided with a backup platform referred to as NetWorker® and the backup storage appliance is referred to as Data Domain, each of which are provided by EMC Corporation of Hopkinton, Mass. It should be appreciated, however, that while some embodiments are shown and described in conjunction with NetWorker® and Data Domain, aspects and principles of the system can be applicable to other backup platforms and storage systems.

Product development currently is going through a rapid transformation to meet market needs both in terms of economy as well as responsiveness. It is no longer a request and deliver mechanism. Much is dependent upon how the product behaves post sales and the experience the customer receives. Customers understand that no product can be defect-free but what is important is how the product heals, reports and responds when the issue occurs. The instance when an issue is reported and the time it takes to return the product back to a normal operative model is critical and hence serviceability is a very desirable requirement in products. The serviceability challenge is also one of the key issues that chief information officers (CIOs) from many information technology (IT) industries are trying to address from different perspectives. Such perspectives include various data centers for different customer segments to which they have sold their companies' products which can reduce the cost and complexity of managing it within the data center. This challenge is translated to respective administrators managing the products.

Products move through various phases and have to meet environments which can scale up exponentially. During this transformation, products will start facing increased serviceability challenges such as performance, scalability, endurance, optimum operational level, usability, and so forth. There is a need for products to be more robust to handle auto tuning, auto correction and better logging to reduce the serviceability challenges. Early detection of potential problems is critical to address the serviceability related issues. Though these are the intentions, the solutions that are in the market are far from this and there are many total customer experience (TCE) issues arising due to lack of responsiveness and intelligence in the products.

The dynamic serviceability engine addresses some of the serviceability challenges that backup and recovery products are currently facing in the field and data protection market. Many backup and recovery products have serviceability challenges where they lag intelligent responsiveness and self-healing mechanisms. It would be desirable to not just respond to the issue but also to prevent the issue in itself by parsing through the logs and other patterns.

It would be desirable for error messages to be more user-friendly. There can be scalability challenges related to making a product more robust. In some cases, it is desirable to pop-up warning messages when the workload pattern shifts, e.g., backup stream count is reaching beyond its regular limit or the number of backup clients backing up to the same storage node has increased by 100 percent.

Many of today's backup products provide a rich feature set such that end users can use different features to achieve the same goal. This is generally desirable as users can always find alternate approaches to obtain the desired result. However, it presents challenges when troubleshooting a problem especially in cases where an end user may lack experience with the product. For example, a customer may report that the backup application hangs every night at 9 PM and that the log is flooded with "many RPC error messages" from a particular process or daemon. Such messages may be vague and may not provide any clue as to what is really going wrong with the particular process. Understanding the issue may require a subject matter expert (SME) to debug the problem in detail to understand what is happening before the product hangs. This case is merely one example of serviceability challenges that product engineering and support teams are facing and there are many such examples.

Further complicating matters is that generally no product is deployed in isolation so serviceability challenges are multifold in real time. For example, the product often must interface with various other products. There can be a tight integration with backup storage components to service the backup request and provide a more granular restore approach by cataloging them.

It is desirable that a backup application servicing the requests and interacting with other products also understand the capabilities of the other products to be robust in different demanding situations. For example, a backup storage appliance may be shared across two different data zones. When the overall stream count of the backup storage appliance exceeds its limit, the product should understand such a situation and alert the user of possible damage with further load.

It is desirable that the product be robust in logging the serviceability messages by anticipating the demand and scalability requirements. These issues can arise when the product is often shifting from its normal operational workflows. For example, a backup server may be backing up 100 clients to a backup storage appliance. If the workload increases by, for example, 100 percent, the backup server may start deviating in performance characteristics over a period of time. If the user is not provided with notification, the user will not be aware of the potential performance impact. If, however, such workload demands are logged into a centralized location, then engineering/support/technical consultants (TC)/professional services engineers (PSE)/customer service (CS) can look into such logs and understand the pattern of changes over the period of time when the product started deviating from its original functionality. It is desirable that the product efficiently anticipate the possible damage and pop-up a notification using an alerting mechanism. The notification can be displayed thru a console user interface.

Many backup products and systems lack a service engine within the backup product that addresses specifically serviceability related challenges. It is desirable to provide a service engine which can alert the user when there are demand changes, when there is a performance degradation, when faults have occurred, and self-heal to reduce some of these possible issues. This can help increase the robustness of the backup environment to handle the serviceability challenges.

In many cases, serviceability in a backup application is mainly ad-hoc in nature. There are no clear messages. Current backup applications do not address the serviceability challenges that the field is facing especially in regards to providing smart logging, alert warnings, and providing hints to prevent the errors. The troubleshooting of serviceability challenges becomes expensive because of the complexity of the product and integrated features. It is desirable to prevent errors from occurring. In a specific embodiment, techniques are provided for smart logging and alerting the user in cases where the application reaches the threshold values that different components involved in a backup may have. Current backup applications do not capture the maximum limits or threshold values of the components they interact with such as the backup stream count based on the model of the storage appliance. There is a lack of serviceability specific messages in the application log file. Serviceability specific messages can help the end user to troubleshoot the application issues involving serviceability, reliability and performance.

Some benefits of the dynamic serviceability engine include a smart approach to manage serviceability related queries; a user friendly approach to alert or highlight the issues that can occur by identifying the problem based on defined limits; a smart way of preventing the issues by providing pop-up messages in the product console graphical user interface (GUI); translation of online or recommended best practices into rules and adding them into a rules database to help prevent sizing related issues by alerting the user as to when a limit is exceeded; improvement of the total customer experience; enhancing the efficiency of resolving the issues by, for example, 20-30 percent with a self-prevention mechanism. In a specific embodiment, the dynamic serviceability engine itself can be integrated or decoupled. Rules and corrective algorithms can be added without having to wait for releases of the entire backup application.

Figure 6:
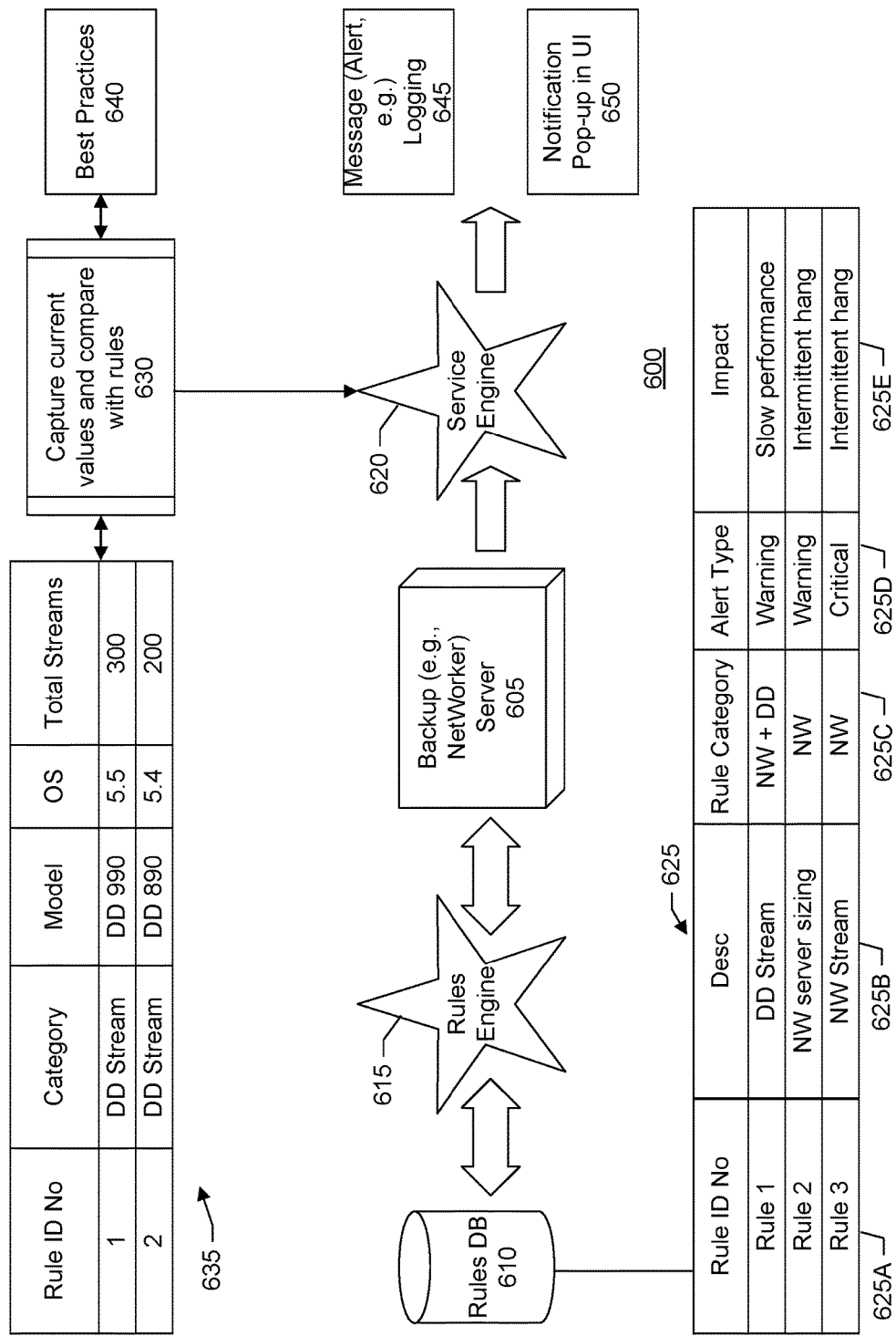
FIG. 6 shows a high-level architecture and flow of a dynamic serviceability engine according to a specific embodiment.

FIGS. 6-8 show a specific embodiment of the dynamic serviceability engine as may be implemented in the NetWorker® backup platform from EMC Corporation. Embodiments of the system, however, are not limited to any particular backup platform. Therefore, it should be appreciated that the description of the embodiments that follow is for purposes of illustration and not limitation.

FIG. 6 shows a high-level architecture and flow diagram of a backup environment 600 having a dynamic serviceability engine. As shown in the example of FIG. 6, there is a backup server (e.g., NetWorker®) 605, a rules database 610, a rules engine 615, and a service or dynamic serviceability engine 620. In brief, a set of rules 625 are predefined and stored in the rules database. The rules engine evaluates the rules. The service engine captures current backup configuration values 635. The captured configuration information may include the model of the backup storage appliance, operating system of the backup storage appliance, current stream count, or combinations of these. The configuration information is captured and compared with the pre-defined rules 625 at 630. The predefined rules 625 can be based on best practices documentation 640. Based on the comparison, alerts may be logged at 645, notifications may pop-up in a user interface 650, or both.

The dynamic serviceability engine can enhance a backup platform by providing smart handling and smart logging to make the backup application more robust so that it can self-heal the damages or error conditions. In a specific embodiment, a dynamic serviceability engine running within a backup product addresses serviceability challenges and provides the desired services to address challenges from different stake holders.

In a specific embodiment, the dynamic serviceability engine includes pop-up alert/warning messages in the product console user interface when the demand or workload pattern starts increasing above a threshold value. For example, if the backup application reaches 70 percent of the overall session limit on the backup storage appliance (e.g., Data Domain), alert the user that "DD with Model 990 running with OS 5.4 has reached 378 streams (70% threshold value) from last 10 minutes." In a specific embodiment, once the session limit reaches its maximum there is a conversion of the alert to critical. The user is informed about the consequences of an excessive session count (e.g., writes may terminate and throughput will decrease due to excessive queueing).

Serviceability messages may be logged into a log file when certain conditions are met. Logging may include classifying errors, warnings, or critical messages, time-stamping the entries, generating alerts for the user indicating the number of critical, warning and error related messages logged based on duration or frequency. The system may classify the error, warning, and critical patterns from a daemon.log file and log the message, e.g., "nsrd daemon has logged 60 errors messages from the last 1 hour and 600 error messages from the last 24 hours and 6000 from its first start."

There can be a smart alerting in the console user interface. The console can generate an alert for the user when there is a change in workload pattern. Baseline values are defined which the dynamic serviceability engine compares to current configuration information. Alerts are generated if there are wide deviations during product execution.

In a specific embodiment, a smart logging mechanism is provided. The smart logging mechanism provides benefits similar to the pop-up messages mechanism in the console user interface. The smart logging mechanism addresses some of the serviceability related challenges thru a logging mechanism. Key serviceability challenges with the logging mechanism may include checking the errors, warnings and critical messages from the backup application daemon.log file based on process name. Appropriate actions are taken. The service engine can periodically classify the backup application processes related error messages for individual processes and classify them based on their severity such as "critical", "warning" and "error." If at any given point in time the number of severe messages increases continuously beyond a pre-defined frequency, then the dynamic serviceability engine may log the warning message into a new log (e.g., "nsr_serviceability.log"). Instead or additionally, the dynamic serviceability engine can log the same message into the daemon.log file and classify that as a "serviceability message." The user can then filter the serviceability related messages for debugging. Notifications may be generated based on critical serviceability messages so that a user can take appropriate actions once the backup server messages start increasing above a particular frequency.

The baseline values can be kept in a rules database controlled by the rules engine. The rules engine can provide for modifying, updating, and adding new rules to the rules database. The rules database can include values from the backup platform's best practices guide such as a Performance Optimization and Planning Guide or Product Integration Guide. For example, the rules database can include the values of stream counts for different storage appliance models in a table format and user-defined error messages when threshold and actual limits are reached.

More specifically, the rules database stores a set of rules to help ensure good performance of the backup environment. A rule may include attributes or properties such as an identifier (ID) number (No) field 625A, description field 625B, rule category field 625C, alert type field 625D that may be triggered by a rule violation, and an impact field 625E. FIG. 7 shows a detailed table of properties that may be associated with a set of rules 705. This particular set of rules may be referred to as storage appliance stream count related rules or, in a specific embodiment, NetWorker® and Data Domain stream count related rules. Properties or fields associated with rules 705 include a rule identifier (ID)

number (No) field 710A, description field 710B, Data Domain (DD) model number field 710C, Data Domain operating system (OS) version field 710D, session type field 710E, maximum value field 710F, alert type field 710G, and impact field 710H.

The rule identifier field uniquely identifies a particular rule. The description field indicates whether the rule applies to the backup stream count configuration parameter or client count configuration parameter. The DD model field specifies the model number of the backup storage appliance that the rule applies to. The DD OS version field specifies the operating system of the backup storage appliance that the rule applies to. The session type field specifies whether the rule applies to a write session or a read session. For example, a write session refers to writing to the backup storage appliance's backup media such as during a backup. A read session refers to reading from the backup media such as during a recovery or restore. The max value field specifies a threshold value or, more particularly, the maximum number of backup streams that the backup storage appliance supports. The alert type field specifies the type of alert that is triggered when the rule is violated. The impact field stores a notification message that may be displayed to the backup administrator when the rule is violated.

For example, the sample data shown in FIG. 7 indicates that a rule 715 applies to a Data Domain model 990 unit that is running DD OS version 5.5. The rule specifies that this particular backup storage appliance can support a maximum of 540 backup streams. According to the rule, a warning alert is logged if 70 percent of the threshold is reached (e.g., alert logged when 378 or more backup streams are running: 70 percent*540=378) and the message "DD has reached its threshold value of 70% from the last X minutes which causes writes to become slow" is displayed. A rule 720 similarly applies to a Data Domain model 990 unit that is running DD OS version 5.5. According to this rule, however, a critical alert is logged if 100 percent of the threshold is reached and the message "DD has reached its threshold value of 100% from last X minutes which causes sessions to terminate and impacts overall performance."

In a specific embodiment, the rules are predefined based on best practice documents such as performance guides, integration guides, or independent testing. The rules can be classified according to a particular configuration parameter, e.g., "DD stream counts," "NetWorker® server sizing," or "NetWorker® stream count," where stream count refers to the number of running backup streams and server sizing refers to the number of backup clients. These rules are defined or stored in the rules database. In a specific embodiment, these values are statically defined in rules database. There can be any number of rules. The rules reflect best practices to achieve scalability and performance of the backup environment.

In a specific embodiment, the dynamic serviceability engine maintains a table that holds the values from a current configuration running on a backup (e.g., NetWorker®) server. Once the dynamic serviceability engine starts, it builds the dynamic (current running system state) information about key classification of rules such as "Current DD stream count." The dynamic serviceability engine assigns duration to information captured. The dynamic serviceability engine can compare the current configuration value with the max stream count (or a percentage of the max stream count) and if any of the rules are satisfied it can alert the user by sending the pop-up messages in a "monitoring tab" or window of the management console. In a specific embodiment, the dynamic serviceability engine can calculate the max stream count for any specific Data Domain model while configuring the device itself. The dynamic serviceability engine can compare with an existing DD model and OS and fetch the max stream count for a specific model and OS version and pop-up the message in a device configuration wizard. The dynamic serviceability engine can send the notification (if user is not on the monitoring tab) and alert him based on a current stream count on DD with possible consequences. The alerting mechanism can display colored alerts (e.g., red) based on, for example, a 30 minute duration of continuous violations, e.g., if the 70 percent threshold or 100 percent threshold values are continuously logged for more than 30 minutes.

FIG. 8 shows a detailed table of properties that may be associated with a set of rules 805. These rules may be referred to as sizing or NetWorker® sizing related rules. Properties or fields associated with rules 805 include a rule identifier (ID) number (No) field 810A, description field 810B, version field 810C, jobs field 810D, central processing unit (CPU) field 810E, RAM field 810F, clients field 810G, alert type field 810H, and impact field 810I. The rule identifier number field uniquely identifies a particular rule. The description field indicates that the particular rule relates to the number of backup clients supported. The version field specifies the backup application (e.g., NetWorker®) version number that the rule applies to. The jobs field specifies the number of jobs. The CPU field specifies the number of CPUs for the server upon which the backup application is installed. The RAM field specifies the amount of memory on the server. The clients field specifies the number or range of backup clients that are supported. The alert type field specifies the type of alert that is triggered when the rule is violated. The impact field stores a notification message that may be displayed to the backup administrator when the rule is violated.

For example, the sample data shown in FIG. 8 indicates that a rule 815 applies to NetWorker® version 8.2 on a server with 2 CPUs and 8 gigabyte (GB) of RAM. The rule includes a specification of 1000 jobs and a triggering condition when the number of backup clients is between a range of 50 and 100 clients. According to the rule, a warning alert is triggered when the number of backup clients increases above 50 on the NetWorker® server and the message "You may start experiencing hanging and slowness due to memory and CPU crunch" is displayed to the backup administrator.

As another example, a rule 820 applies to NetWorker® version 8.2 on a server with 4 CPUs and 16 GB of RAM. The rule includes a specification of 10000 jobs and a triggering condition when the number of backup clients is between a range of 200 and 500 clients. According to the rule, a warning alert is triggered when the number of backup clients increases above 200 on the NetWorker® server and the message "You may start experiencing hanging and slowness due to memory and CPU crunch" is displayed to the backup administrator.

As another example, a rule 825 applies to NetWorker® version 8.2 on a server with 8 CPUs and 32 GB of RAM. The rule includes a specification of 50000 jobs and a triggering condition when the number of backup clients is between a range of 500 and 1500 clients. According to the rule, a warning alert is triggered when the number of backup clients increases above 500 on the NetWorker® server and the message "You may start experiencing hanging and slowness due to memory and CPU crunch" is displayed to the backup administrator.

The rules shown in FIG. 8 help to address serviceability challenges related to the various sizing constraints that a backup server such as a NetWorker® server may have. For example, there can be best practices that specify minimum system requirements and recommendations. This information can be converted into sizing rules as shown in FIG. 8. In a specific embodiment, the dynamic serviceability engine fetches the backup server resource details. If any workload demand changes from an existing configuration, then the server starts generating and displaying pop-up messages. For example, if a backup server with 8 GB RAM and 2 CPUs is configured with 100 clients, any new clients added into the backup server will trigger an alert for the administrator regarding possible performance and reliability related issues.

The performance rules shown in FIGS. 6-8 are merely examples and there can be other rules that specify other conditions related to performance of the backup environment. Another rule may specify, for example, if the overall backup client stream count increases the server parallelism, alert the user of possible client side queuing. Another rule may specify, for example, if the overall backup client stream count increases the device target sessions (of pool where clients send data) then alert the user of possible client side queuing. Another rule may specify, for example, if overall jobs increase the backup server parallelism then alert the user of possible queuing on backup server.

Figure 9:
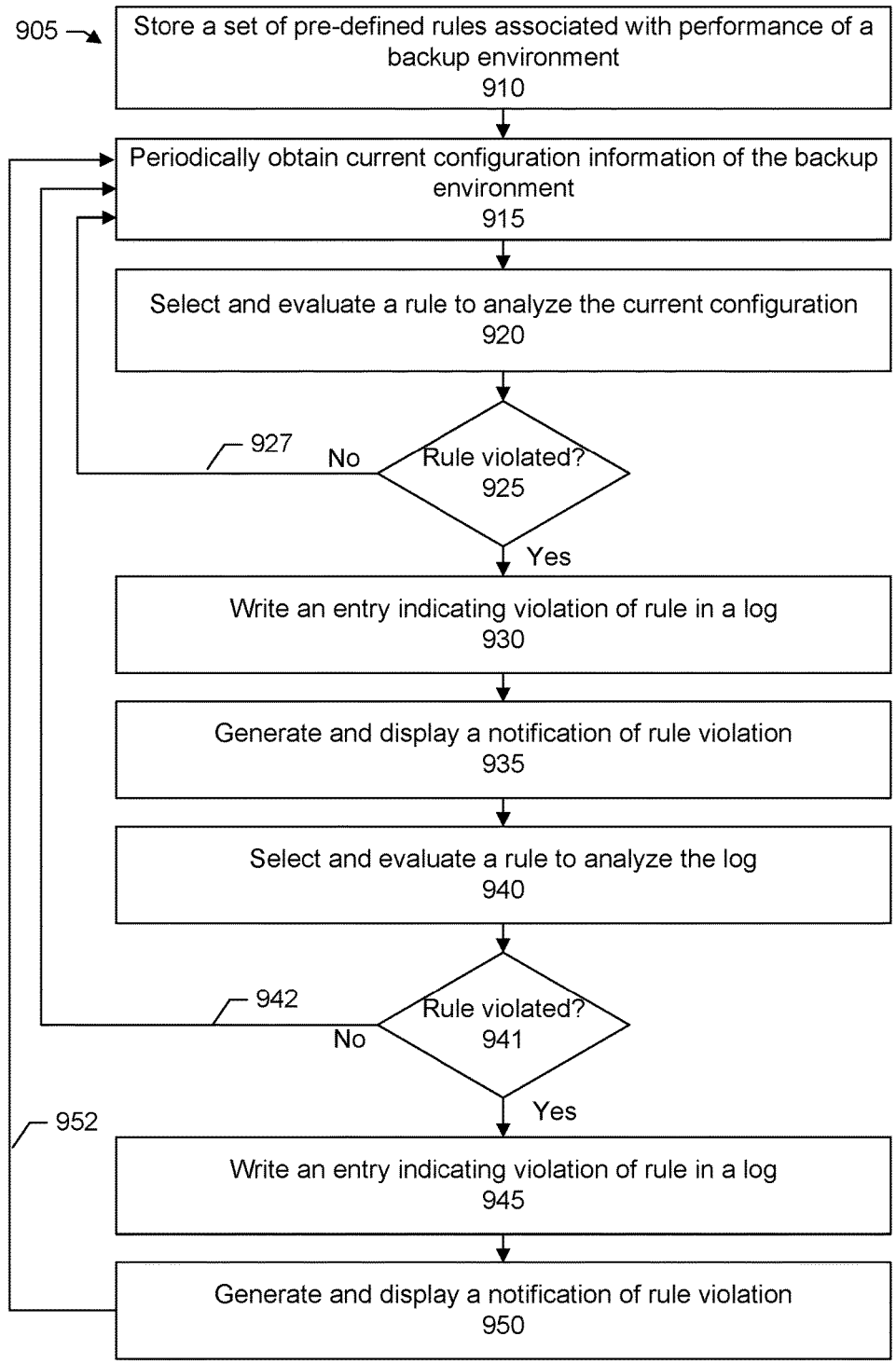
FIG. 9 shows a flow of a process for a dynamic serviceability engine according to a specific embodiment.

FIG. 9 shows a flow of a process 905 for managing the performance of a backup in a computing environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 910, a particular set of rules associated with the performance of a backup environment are defined and stored. In a specific embodiment, a rule includes a set of attributes that identify the backup component that the rule applies to. In this specific embodiment, there can be a rule that applies to monitoring stream counts of a backup storage appliance. The rule includes first, second, third, and fourth attributes, a condition, and action. There can be other attributes. The first attribute identifies the storage appliance model. The second attribute identifies the operating system installed on the backup storage appliance. The third attribute identifies whether the rule applies to a write or read session. The fourth attribute specifies a maximum value of streams (e.g., backup or write streams) this particular backup storage appliance supports. The condition may include a variable representing the current number of backup streams and percentage variable for the maximum or threshold number backup streams supported. The action specifies one or more actions that are to be performed when the condition is satisfied. In a specific embodiment, an action specifies writing an entry of a first alert type (e.g., warning) in a log.

There is another rule that applies to monitoring a number of backup clients that are configured on the backup server. The rule includes first, second, and third attributes, a condition, and an action. There can be other attributes. The first attribute identifies the backup application version. The second attribute identifies the number of processors of the server hosting the backup application. The third attribute identifies the amount of memory (e.g., RAM) on the server. The condition may include a variable representing a current number of backup clients and a percentage variable for the maximum or threshold number of backup clients supported. The action specifies writing an entry of a first alert type (e.g., warning) in a log when the condition is satisfied.

There is another rule that applies to analyzing the log. The rule includes a condition and action that is performed when the condition is satisfied. The condition may include a variable representing the frequency of alerts of the first type (e.g., warning) and a threshold frequency. The action specifies writing an entry of a second alert type (e.g., critical) in the log when the condition is satisfied.

In a step 915, the dynamic serviceability engine periodically obtains current configuration information of the backup environment. FIG. 10 shows a flow of a process for obtaining a stream count from the backup storage appliance. In a step 1010, the dynamic serviceability engine issues a request to the backup storage appliance to provide a number of backup streams currently running or connected to the backup storage appliance. The request may be issued through an application programming interface (API) provided by the backup storage appliance. In a step 1015, the dynamic serviceability engine receives and stores the current number of backup streams as first configuration information.

FIG. 11 shows a flow of a process for obtaining a count of the number of backup clients configured on the backup server. In a step 1110, the dynamic serviceability engine issues a request to the backup application server program to provide a count of the number of backup clients currently configured or managed by the backup server. In a step 1115, the dynamic serviceability engine receives and stores the current number of backup clients as second configuration information.

The frequency at which the dynamic serviceability engine collects configuration information can be configured by the backup administrator. For example, configuration information may be scheduled to be collected every 10, 15, 20, 30, 40, 50, 60, or 120 minutes, or once every 6 or 24 hours, or any other frequency as desired. More frequent collections can provide a more up-to-date view of the current number of backup streams, backup clients, or both. Responding to a request, however, consumes computing resources and collecting information too frequently may impact overall performance. Thus, backup administrators can tune the collection frequency based on their own specific needs and applications.

In a specific embodiment, the frequency at which the stream counts are collected can be the same as or different from the frequency at which the backup client counts are collected. For example, in some cases, depending upon the application, stream counts will change more frequently than the number of backup clients. Thus, the frequency at which the stream counts are updated can be higher than the frequency at which the backup client counts are updated. Being able to configure the configuration collection information frequencies independently helps to ensure judicious use of computing resources.

In a specific embodiment, obtaining current configuration information replaces the previous configuration information. Replacing the previous configuration information helps to conserve storage space. In another specific embodiment, previous configuration information is maintained.

Referring back to FIG. 9, in a step 920, the dynamic serviceability engine selects and evaluates a rule to analyze the current configuration. The rule may be a stream count related rule or a sizing related rule. For example, a stream count related rule may be selected based on the backup storage appliance model and other storage appliance attributes. A sizing related rule may be selected based on the backup application version and specifications of the backup server hosting the backup application.

In a step 925, the dynamic serviceability engine determines whether the rule has been violated. If the rule has not been violated, the process loops back at 927 to step 915. If the rule has been violated, in a step 930, the dynamic serviceability engine writes an entry indicating violation of the rule in a log. In a step 935, the dynamic serviceability engine generates and displays a notification of the rule violation.

In a step 940, the dynamic serviceability engine selects and evaluates a rule for analyzing the log. As discussed above, in a specific embodiment, this rule evaluates the frequency of alerts of the first type (e.g., warning alerts). A determination is made as to whether the rule is violated (step 941). If the rule has not been violated, the process loops back at 942 to step 915. If the rule has been violated, in a step 945, the dynamic serviceability engine writes an entry indicating violation of the rule to the same or different log. For example, the entry may include an alert of a second type (e.g., critical) having a priority higher than the alert of the first type (e.g., warning). In a step 950, the dynamic serviceability engine generates and displays a notification of the rule violation and the process loops back at 952 to step 915 to continue monitoring the backup environment.

Figure 12:
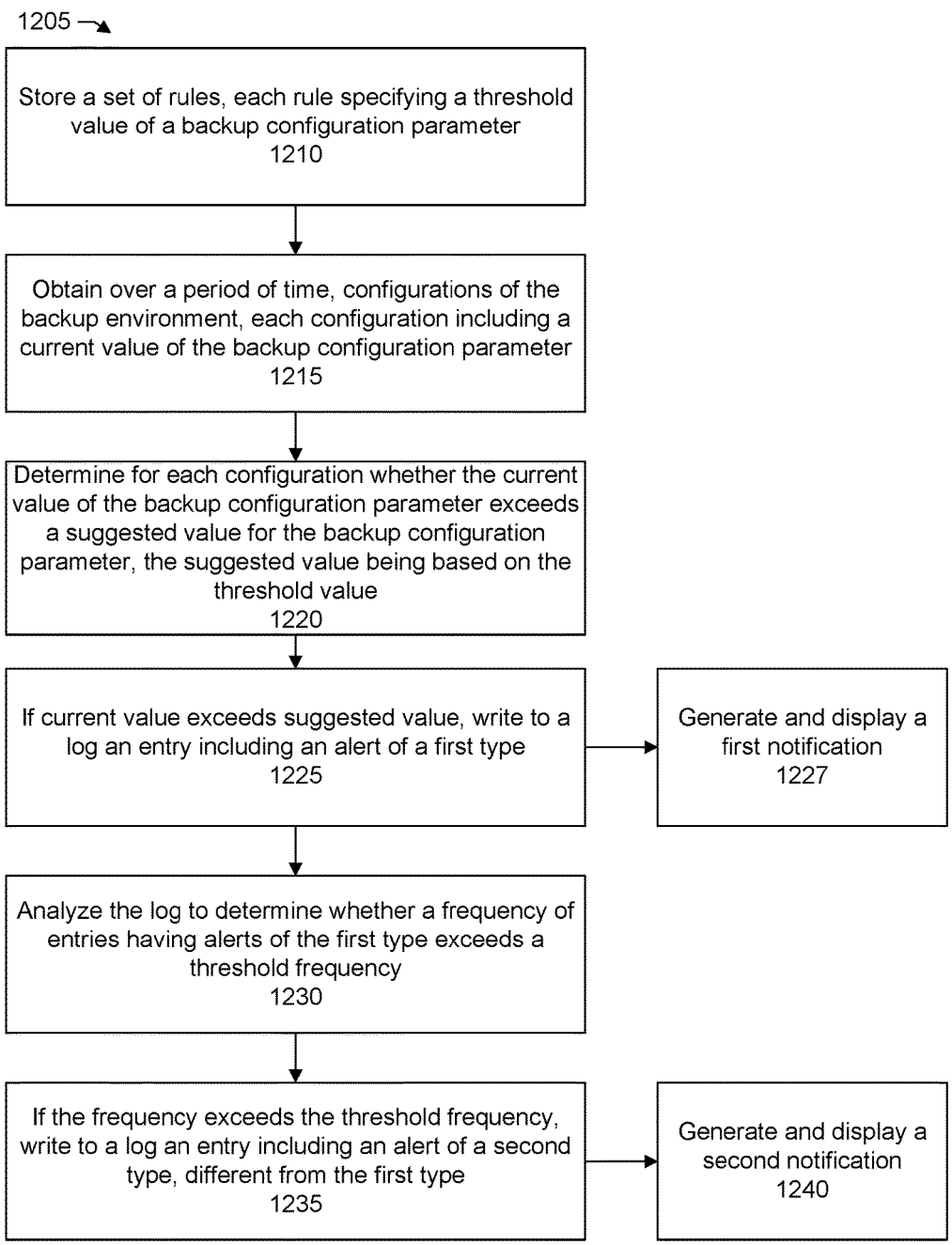
FIG. 12 shows another flow of a process for a dynamic serviceability engine according to a specific embodiment.

FIG. 12 shows a flow of a process 1205 for managing the performance of a backup environment according to another specific embodiment. In a step 1210, a particular set of rules are stored. Each rule specifies a threshold value of a backup configuration parameter. In a specific embodiment, a first backup configuration parameter specifies a stream count, and a second backup configuration parameter specifies a backup client count.

In a step 1215, configuration information of the backup environment is periodically obtained over a period of time, each configuration including a current value of the backup configuration parameter. For example, obtaining configuration information at a first time may include obtaining a number of backup streams, clients, or both at the first time. Obtaining configuration information at a second time, after the first time, may include obtaining a number of backup streams, clients, or both at the second time.

In a step 1220, a determination is made for each obtained configuration whether the current value of the backup configuration parameter exceeds a suggested or recommended value for the backup configuration parameter. The suggested value is based on the threshold value corresponding to the backup configuration parameter. In a specific embodiment, the suggested value is based on a percentage of the threshold value. For example, the suggested value may be 60, 65, 70, 75, 80, 85, 90, 95, or 100 percent of the threshold value. The percentage can be user-configurable.

In a step 1225, if the current value exceeds the suggested value, an entry is written to a log. The entry includes an alert of a first type (e.g., warning). In a step 1227, a notification is generated and displayed indicating that an alert of a first type has been logged.

In a step 1230, the log is analyzed to determine whether a frequency of entries having alerts of the first type (e.g., warning) exceeds a threshold frequency. The threshold frequency can be user-configurable. In a step 1235, if the frequency exceeds the threshold frequency, an entry is written to the same or different log. The entry includes an alert of a second type (e.g., critical), different from the first alert type. For example, the second alert type may have a higher priority than the first alert type. In a step 1240, a notification is generated and displayed indicating that an alert of a second type has been logged. A notification for an alert of the second type (e.g., critical) may include a more urgent message than a notification for an alert of the first type (e.g., warning). The analysis of the log helps to provide the backup administrator with an understanding of the cumulative impact of exceeding or approaching the threshold limits of the backup components.

Figure 13:
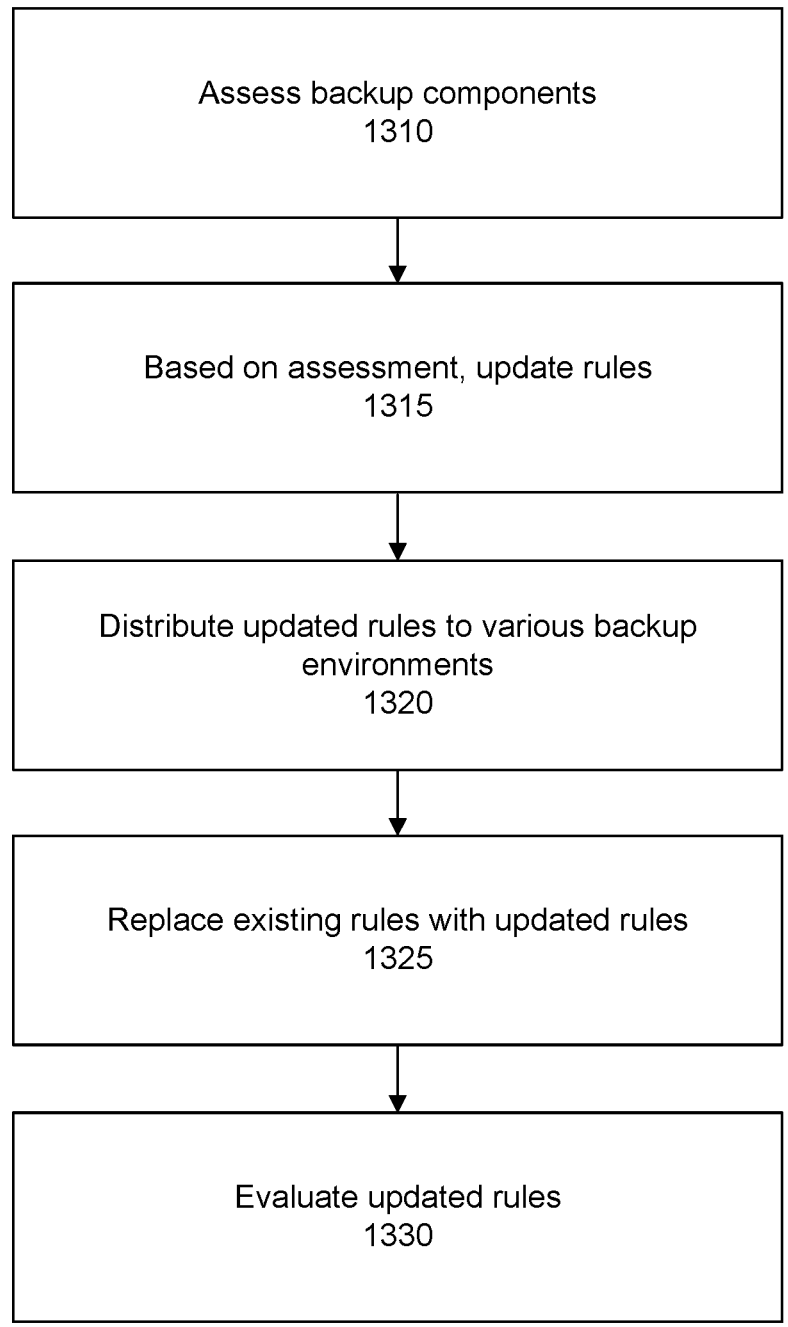
FIG. 13 shows a flow of a process for updating rules according to a specific embodiment.

FIG. 13 shows a flow of a process for updating rules. In a step 1310, backup components are assessed. The backup components may include backup applications, platforms, storage appliances, backup servers, and so forth. The assessment may include testing the backup components under varying conditions to identify threshold values. The backup components may be from any number of different vendors.

In a step 1315, based on the assessment, rules are updated. A threshold value of a rule may be changed or updated depending upon the assessment. For example, an assessment of a particular backup storage appliance may reveal that it has a lower backup stream count than previously thought. Thus, a stream count rule for the backup storage appliance may be updated to reflect the new backup stream count threshold. Updating the rules may include adding new rules to the rules database. For example, a new rule may be added for a newly assessed backup storage appliance.

In a step 1320, the updated rules are distributed to the various backup environments. For example, the updated rules may be distributed to various customers of the backup application platform.

In a step 1325, existing rules at a customer site are replaced with the updated rules. In a step 1330, the updated rules are evaluated. Thus, systems and techniques are provided to facilitate a continuous process of optimizing or improving the performance of a customer's backup environment. New or updated rules can be created as new best practices are discovered. The new or updated rules can then be pushed out to the various customers of the backup platform.

In a specific embodiment, a method for managing performance of a backup environment includes storing a plurality of rules, each rule specifying a threshold value of a backup configuration parameter, obtaining over a period of time, configurations of the backup environment, each configuration comprising a current value of the backup configuration parameter, determining for each configuration whether the current value of the backup configuration parameter exceeds a suggested value for the backup configuration parameter, the suggested value being based on the threshold value, if the current value of the backup configuration parameter exceeds the suggested value, writing an entry comprising an alert of a first type to a log, analyzing the log to determine whether a frequency of entries in the log comprising alerts of the first type exceeds a threshold frequency, and if the frequency exceeds the threshold frequency, writing an entry comprising an alert of a second type, different from the first type, to the log.

The threshold value of the backup configuration parameter may specify a maximum number of backup streams. The threshold value of the backup configuration parameter may specify a maximum number of backup clients. The suggested value may include a percentage of the threshold value.

In a specific embodiment, writing the entry comprising an alert of a first type to the log comprises displaying on an electronic screen a first notification that informs a user of a first impact to the performance of the backup, and writing an alert of the second type to the log comprises displaying on the electronic screen a second notification that informs the user of a second impact to the performance of the backup, different from the first impact.

Obtaining over a period of time configurations of the backup environment may include issuing at a first time, a request to a backup storage appliance to provide a number of backup streams currently connected to the backup storage appliance; and issuing at a second time, after the first time, another request to the backup storage appliance to provide another number of backup streams currently connected to the backup storage appliance.

Obtaining over a period of time configurations of the backup environment may include identifying at a first time a number of backup clients currently configured within the backup environment; and identifying at a second time, after the first time, another number of backup clients currently configured within the backup environment.

In another specific embodiment, there is a system for managing performance of a backup environment, the system comprising a processor-based system implemented on a computer system and configured to store a plurality of rules, each rule specifying a threshold value of a backup configuration parameter, obtain over a period of time configurations of the backup environment, each configuration comprising a current value of the backup configuration parameter, determine for each configuration whether the current value of the backup configuration parameter exceeds a suggested value for the backup configuration parameter, the suggested value being based on the threshold value, if the current value of the backup configuration parameter exceeds the suggested value, write an entry comprising an alert of a first type to a log, analyze the log to determine whether a frequency of entries in the log comprising alerts of the first type exceeds a threshold frequency, and if the frequency exceeds the threshold frequency, write an entry comprising an alert of a second type, different from the first type, to the log.

In another specific embodiment, there is a computer program product, comprising a non-transitory computer-readable medium having a computer-readable program code embodied therein, the computer-readable program code to be executed by one or more processors to implement a method comprising storing a plurality of rules, each rule specifying a threshold value of a backup configuration parameter, obtaining over a period of time configurations of the backup environment, each configuration comprising a current value of the backup configuration parameter, determining for each configuration whether the current value of the backup configuration parameter exceeds a suggested value for the backup configuration parameter, the suggested value being based on the threshold value, if the current value of the backup configuration parameter exceeds the suggested value, writing an entry comprising an alert of a first type to a log, analyzing the log to determine whether a frequency of entries in the log comprising alerts of the first type exceeds a threshold frequency, and if the frequency exceeds the threshold frequency, writing an entry comprising an alert of a second type, different from the first type, to the log.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for managing performance of a backup environment having a plurality of backup clients to be backed up, and a backup storage appliance that receives a plurality of backup streams from the backup clients, the method comprising:
    storing a plurality of rules, each rule specifying a threshold value of a backup configuration parameter, the backup configuration parameter corresponding to a number of the plurality of backup clients, or a number of the plurality of backup streams;
    obtaining, over a period of time, configurations of the backup environment, each configuration comprising a current value of the backup configuration parameter;
    determining for each configuration whether the current value of the backup configuration parameter exceeds a suggested value for the backup configuration parameter, the suggested value being based on the threshold value;
    if the current value of the backup configuration parameter exceeds the suggested value, writing an entry comprising an alert of a first type to a log;
    analyzing the log to determine whether a frequency of entries in the log comprising alerts of the first type exceeds a threshold frequency; and
    if the frequency exceeds the threshold frequency, writing an entry comprising an alert of a second type, different from the first type, to the log,
    wherein writing an entry comprising an alert of the first type to the log comprises displaying on an electronic screen a first notification that informs a user of a first impact to the performance of the backup, and
    wherein writing an entry comprising an alert of the second type to the log comprises displaying on the electronic screen a second notification that informs the user of a second impact to the performance of the backup, different from the first impact.

2. The method of claim 1 wherein the threshold value of the backup configuration parameter specifies a maximum number of backup streams.

3. The method of claim 1 wherein the threshold value of the backup configuration parameter specifies a maximum number of backup clients.

4. The method of claim 1 wherein the suggested value comprises a percentage of the threshold value.

5. The method of claim 1 wherein the obtaining, over a period of time, of configurations of the backup environment comprises:
    issuing at a first time, a request to the backup storage appliance to provide a number of backup streams currently being received at the backup storage appliance; and
    issuing at a second time, after the first time, another request to the backup storage appliance to provide another number of backup streams currently being received at the backup storage appliance.

6. The method of claim 1 wherein the obtaining, over a period of time, of configurations of the backup environment comprises:
 identifying at a first time, a number of backup clients currently configured within the backup environment; and
 identifying at a second time, after the first time, another number of backup clients currently configured within the backup environment.

7. A system for managing performance of a backup environment having a plurality of backup clients to be backed up, and a backup storage appliance that receives a plurality of backup streams from the backup clients, the system comprising:
 a backup server comprising a processor and a computer-readable storage medium storing program code of a dynamic serviceability engine, wherein the processor executes the program code to cause the processor to perform operations comprising:
 storing a plurality of rules, each rule specifying a threshold value of a backup configuration parameter, the backup configuration parameter being associated with a number of the plurality of backup clients, or a number of the plurality of backup streams;
 obtaining, over a period of time, configurations of the backup environment, each configuration comprising a current value of the backup configuration parameter;
 determining for each configuration whether the current value of the backup configuration parameter exceeds a suggested value for the backup configuration parameter, the suggested value being based on the threshold value;
 if the current value of the backup configuration parameter exceeds the suggested value, writing an entry comprising an alert of a first type to a log;
 analyzing the log to determine whether a frequency of entries in the log comprising alerts of the first type exceeds a threshold frequency; and
 if the frequency exceeds the threshold frequency, writing an entry comprising an alert of a second type, different from the first type, to the log,
 wherein the processor executes the program code to cause the processor to write an entry comprising an alert of the first type, by:
 displaying on an electronic screen a first notification that informs a user of a first impact to the performance of the backup when the current value for the backup configuration parameter exceeds the suggested value, and
 wherein the processor executes the program code to cause the processor to write an entry comprising an alert of the second type, by:
 displaying on the electronic screen a second notification that informs the user of a second impact to the performance of the backup, different from the first impact when the frequency exceeds the threshold frequency, and
 wherein the display of the second notification causes an action comprising a change to a configuration of the backup environment.

8. The system of claim 7 wherein the threshold value of the backup configuration parameter specifies a maximum number of backup streams.

9. The system of claim 7 wherein the threshold value of the backup configuration parameter specifies a maximum number of backup clients.

10. The system of claim 7 wherein the suggested value comprises a percentage of the threshold value.

11. The system of claim 7 wherein the processor executes the program code to cause the processor to obtain the configurations, by:
 issuing at a first time, a request to the backup storage appliance to provide a number of backup streams currently connected to the backup storage appliance; and
 issuing at a second time, after the first time, another request to the backup storage appliance to provide another number of backup streams currently connected to the backup storage appliance.

12. The system of claim 7 wherein the processor executes the program code to cause the processor to obtain the configurations, by:
 identifying at a first time, a number of backup clients currently configured within the backup environment; and
 identifying at a second time, after the first time, another number of backup clients currently configured within the backup environment.

13. A computer program product, comprising a non-transitory computer-readable storage medium having a computer-readable program code embodied therein, the computer-readable program code to be executed by one or more processors to implement a method for managing performance of a backup environment, the backup environment having a plurality of backup clients to be backed up, and a backup storage appliance that receives a plurality of backup streams from the backup clients, the method comprising:
 storing a plurality of rules, each rule specifying a threshold value of a backup configuration parameter, the backup configuration parameter specifying a number of the plurality of backup clients, or a number of the plurality of backup streams;
 obtaining, over a period of time, configurations of the backup environment, each configuration comprising a current value of the backup configuration parameter;
 determining for each configuration whether the current value of the backup configuration parameter exceeds a suggested value for the backup configuration parameter, the suggested value being based on the threshold value;
 if the current value of the backup configuration parameter exceeds the suggested value, writing an entry comprising an alert of a first type to a log;
 analyzing the log to determine whether a frequency of entries in the log comprising alerts of the first type exceeds a threshold frequency; and
 if the frequency exceeds the threshold frequency, writing an entry comprising an alert of a second type, different from the first type, to the log,
 wherein writing an entry comprising an alert of the first type to the log comprises displaying on an electronic screen a first notification that informs a user of a first impact to the performance of the backup environment, and
 wherein writing an entry comprising an alert of the second type to the log comprises displaying on the electronic screen a second notification that informs the user of a second impact to the performance of the backup environment, different from the first impact, and
 wherein, based on the display of the second notification, a change to a configuration of the backup environment is received, the change resulting in a decrease in time to complete a backup.

14. The computer program product of claim 13 wherein the threshold value of the backup configuration parameter specifies a maximum number of backup streams.

15. The computer program product of claim 13 wherein the threshold value of the backup configuration parameter specifies a maximum number of backup clients.

16. The computer program product of claim 13 wherein the suggested value comprises a percentage of the threshold value.

17. The computer program product of claim 13 wherein the obtaining, over a period of time, of configurations of the backup environment comprises:
   issuing at a first time, a request to the backup storage appliance to provide a number of backup streams currently being processed by the backup storage appliance; and
   issuing at a second time, after the first time, another request to the backup storage appliance to provide another number of backup streams currently being processed by the backup storage appliance.

* * * * *